United States Patent [19]
Harkness et al.

[11] Patent Number: 5,388,934
[45] Date of Patent: Feb. 14, 1995

[54] MACHINE TOOLS

[75] Inventors: Paul T. Harkness, Halifax; Michael J. Haspel, Bingley; Bernard A. Squires, Huddersfield, all of England

[73] Assignee: William Asquith (1981) Limited, Halifax, England

[21] Appl. No.: 59,909

[22] Filed: May 10, 1993

[51] Int. Cl.⁶ .............................................. B23C 1/06
[52] U.S. Cl. ........................... 409/131; 409/144; 409/211; 409/231
[58] Field of Search ............... 409/131, 143, 144, 199, 409/201, 211, 215, 230, 231

[56] References Cited

U.S. PATENT DOCUMENTS

| | | | |
|---|---|---|---|
| 2,722,161 | 11/1955 | Berthiez | 409/230 |
| 3,460,435 | 8/1969 | Hucks et al. | 409/230 |
| 3,735,459 | 5/1973 | Allen | 409/211 |
| 4,557,645 | 12/1985 | Marsland | 409/230 |
| 4,570,313 | 2/1986 | Holmstrom et al. | 409/231 |
| 4,614,468 | 9/1986 | Waldrich et al. | 409/215 |
| 4,720,221 | 1/1988 | Yoshioka et al. | 409/230 |
| 5,027,682 | 7/1991 | Aiso et al. | 409/230 |

Primary Examiner—Daniel W. Howell
Attorney, Agent, or Firm—Thomas R. Vigil

[57] ABSTRACT

A drive shaft 40 extends through a ram 42. The ram can be driven up and down by rotating a screw shaft 35. The ram carries with it a motor 44 which drives a pulley 36 connected to the top of the shaft 40 for rotating that shaft 40. The ram 42 can be rotated upon operation of a motor 60 which drives a worm 62 to engage a worm wheel 64 which surrounds the ram 42 and is fast therewith.

18 Claims, 3 Drawing Sheets

MACHINE TOOLS

The present invention relates to a machine tool arrangement and to a method of operating a machine tool arrangement.

In a known machine tool, shown schematically in FIG. 1, a ram 1 is able to reciprocate in a vertical direction within a housing 2 and, within the ram 1, a torque tube 3 is able to rotate relative to the ram and is constrained to move with the ram. The bottom of the torque tube is able to be connected to a machine tool unit and a drive shaft 4 extending through the torque tube is able to rotate relative to the ram and torque tube in order to rotate a tool of the tool unit. Such a construction is expensive and complicated to manufacture, as it is necessary to provide a linear guide for the ram and then, within the ram, to also provide separately for the rotational mounting of the torque tube. Furthermore, because the drive shaft is surrounded by the torque tube, and because the torque shaft is surrounded by the ram, the unit has a large cross-sectional area which prevents the ram from entering openings in workpieces which are smaller than the cross-sectional area of the ram.

It is an object of the present invention to attempt to overcome at least some of the above disclosed disadvantages.

According to one aspect of the present invention, a machine tool arrangement includes a housing, a ram and a drive shaft, the drive shaft extending through the ram and being rotatable relative to the ram, and the ram being movable relative to the housing both translationally and pivotally.

The ram and the housing may include cooperating portions, which may cooperate directly, which enable the ram to move translationally and pivotally relative to the housing.

The pivotal movement of the ram relative to the housing may be rotatable movement.

At least a part of the ram may include a cylindrical outer surface. Part of the housing may include an inwardly facing cylindrical surface. The cylindrical surface of the ram and the housing may comprise the cooperating portions of the ram and housing which enable the ram to move translationally and pivotally relative to the housing.

The housing may include clamping means selectively operable to provide maximum stiffness to the machine tool for instance during certain high performance machining operations. The clamping means may be arranged to cooperate with the ram at two spaced locations. The clamping means may be hydraulically operable. The clamping means may extend around the ram, for instance circumferentially around the ram.

The ram may be connected to an intermediate portion, slidably mounted on the housing. The connection of the ram with the intermediate portion may be located on the opposite side of the cooperating portions of the ram and housing to that on which the output of the drive shaft is located.

The intermediate portion may include drive means arranged to cause the ram to rotate relative to the housing. The drive means may comprise a worm gear arranged to rotate about an axis fixed with respect to the intermediate portion and arranged to engage a worm wheel constrained to rotate with the ram.

The intermediate portion and the ram may include locking means, operable to prevent rotation of the ram relative to the intermediate portion. The locking means may be hydraulically operable. The locking means may also be operable to cause the ram to be fixed in one of a plurality of fixed positions relative to the intermediate portion. The locking means may include a locking member movable between a locked position in which relative rotation between the ram and the intermediate portion is prevented and a release position in which relative rotation may occur. The locking member may be mounted on a flexible member which is able to flex to enable the locking member to move between the locked and the release positions. The locking member or the flexible member or both may extend around the ram.

The drive shaft may extend beyond one or both ends of the ram. The drive shaft may be arranged to be driven by further drive means arranged to move with the intermediate portion.

The end of the ram may be provided with tool unit engaging means which enable the ram to be connected to a tool unit. Control means which may include hydraulic or electric means, may be provided via the intermediate portion to control the tool unit engaging means at the end of the ram.

The housing may be movable about at least one, and preferably two axes extending transversely to the direction in which the ram is movable translationally relative to the housing.

According to another aspect of the present invention, a method of operating a machine tool arrangement including a housing, a ram and a drive shaft in which the drive shaft extends through the ram and is rotatable relative to the ram comprises moving the ram translationally and pivotally relative to the housing.

The ram may cooperate, possibly directly, with the housing during the pivotal and translational movement.

The method may comprise the ram moving simultaneously translationally and pivotally relative to the housing.

The method may comprise moving the ram rotatably relative to the housing.

The method may comprise causing a surface of the ram to slide and pivot against a surface of the housing.

The method may comprise applying a clamping means to increase stiffness between the ram and the housing.

The method may comprise causing rotation of a tool with the drive shaft and simultaneously causing translational or pivotal movement or both of the same whilst a workpiece is being machined with a tool.

The method may comprise retaining the pivotal position of the ram relative to the housing in one of a number of possible discrete relative positions.

The present invention may be carried into practice in various ways but one embodiment will now be described by way of example and with reference to the accompanying drawings in which.

Figure 1:
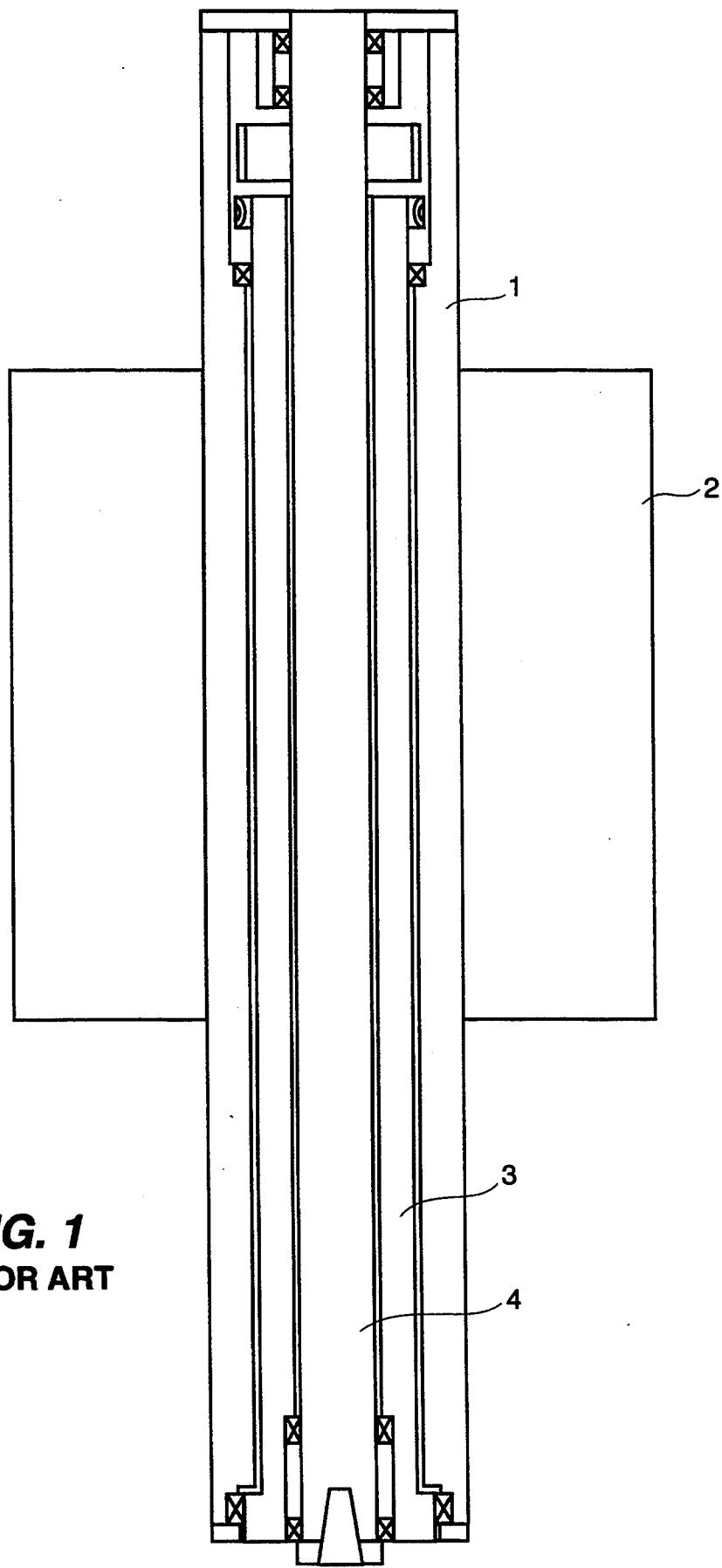
FIG. 1 is a schematic view of a prior art machine tool.
Figure 2:
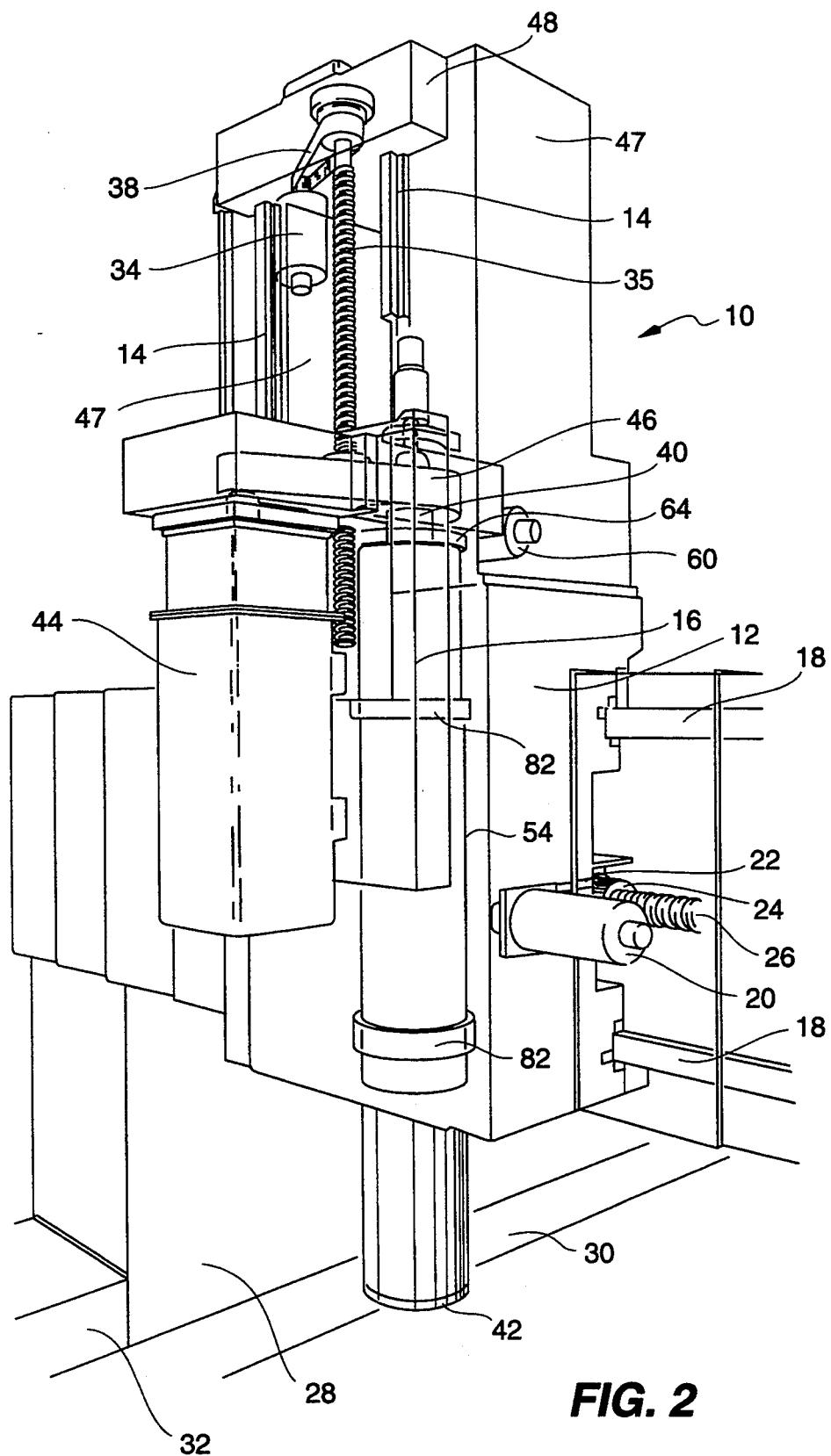
FIG. 2 is a schematic perspective view of a machine tool showing schematically the rotational provision for the ram.

As shown schematically in FIG. 2, the machine tool 10 includes a cast housing 12 which includes a pair of spaced, parallel vertical rails 14 on which a main transmission carriage 16 may slide up and down in the vertical or Z direction and which is constrained against any rotation.

The housing 12 is able to move in the horizontal x and y directions as follows.

The housing 12 is mounted on parallel rails 18 which extend in the y direction and which are secured to their related structure 28 over the full length. A motor 20 mounted on the housing drives, via a belt 22, a ring 24 which threadably engages a ball screw 26 which extends parallel with the rails 18. The ring is rotatable relative to the housing but is otherwise constrained to move with the housing, whereby rotation of the ring causes the housing to be driven along the ball screw in the y direction with the housing sliding on the rails. The direction of movement in the y direction of the housing can be altered by changing the direction of rotation of the ring.

Each side of the structure 28 (only one of which is shown) is slidably mounted on spaced parallel rails 30 which extend in the x direction. Driving means 32 (shown schematically) cause the structure to be slid along the rails 30 in the required direction.

The carriage 16 is driven up and down in the z direction by a motor 34 mounted on the housing which rotates a ball screw shaft 35 via a belt 38 in the required direction. The carriage 16 is suspended on the shaft 36 and threadably engages that shaft which, by rotation, causes the carriage to slide on the rails 14.

The carriage 16 supports, and carries with it in the vertical direction, a drive shaft 40 and a ram 42 through which the shaft 40 extends. The shaft 40 is rotatably driven by a motor 44 mounted on the carriage which drives a pulley 46 connected to the top of the shaft 40.

In order to enable the ram, carriage and shaft to move up and down relative to the housing, the upper part of the housing is in the form of an arch having upwardly extending spaced sides 47 connected at their upper ends by a top 48.

The lower end of the housing includes a cylindrical guide passage 54 within which the ram is able to slide up and down in the vertical direction and within which the ram can rotate as described later. The cylindrical guide passage is lined with a layer including at least some plastics. The ram is hardened and precision ground.

Figure 3:
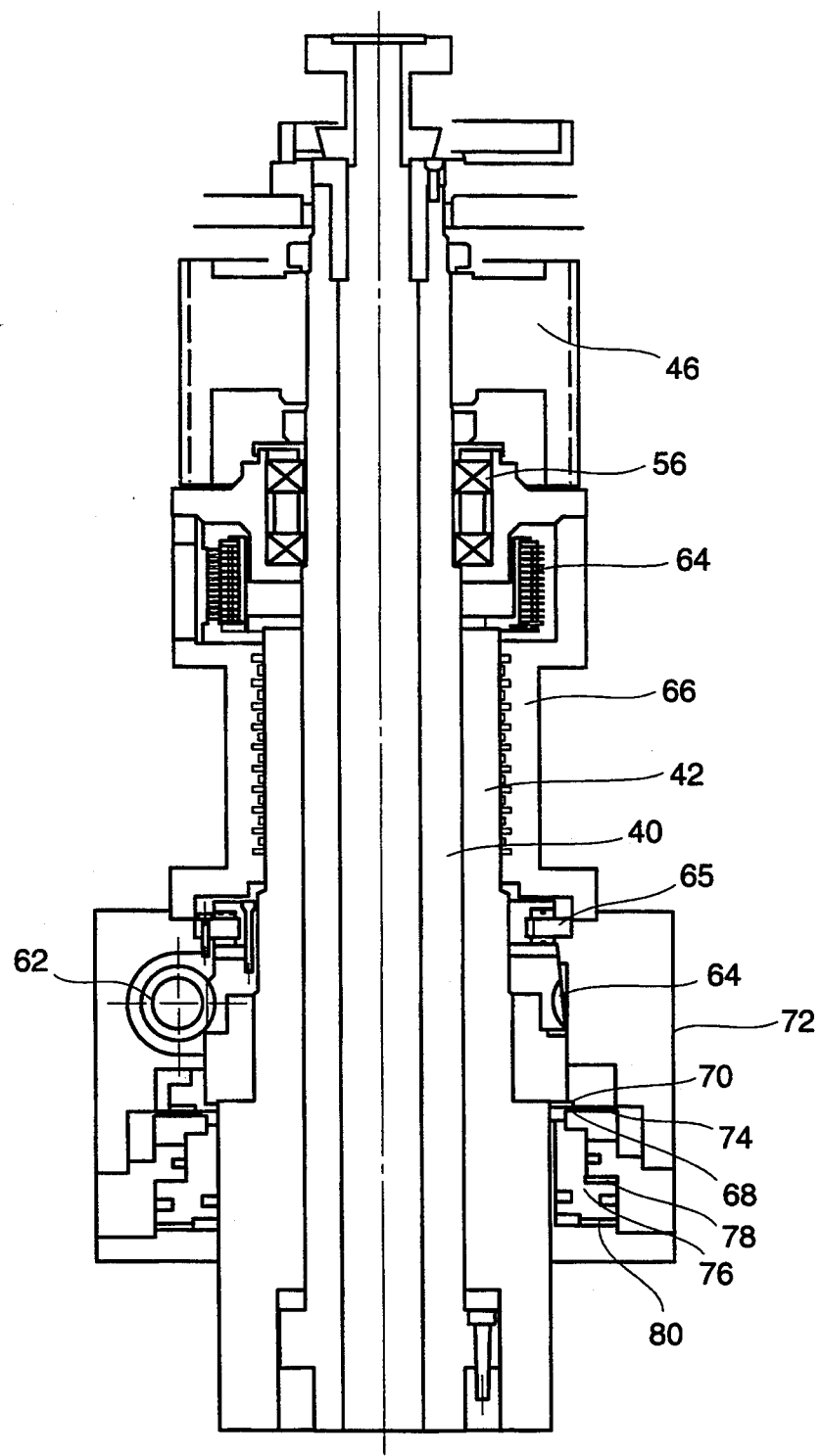
FIG. 3 is a detailed cross-sectional view showing the means for effecting rotation of the ram.

FIG. 3 is a detailed cross-sectional view through the ram 42 and the shaft 40 in the region of their coextent with the carriage. All of the components shown in FIG. 3 are constrained to move together with the carriage in the z direction.

The pulley 46 which drives the shaft 40 is shown at the top of the figure. The shaft 40 is rotatably supported in bearings 56 mounted in the carriage and the cylindrical shaft 40 extends downwardly through the ram 42 and is rotatably supported by further bearings (not shown) towards the bottom of the ram.

The ram 42 is itself rotatable, separate from the shaft 40, upon operation of a motor 60 (shown schematically in FIG. 2) which drives a worm 62, as shown in FIG. 3. The worm 62 engages a worm wheel 64 which surrounds the ram 42 and is fast therewith in order to cause the ram to rotate about the z axis. The ram may rotate in either direction in dependence upon the direction of rotation of the worm.

A thrust and journal bearing 65 is located just above the wormwheel and the bearing acts on the periphery of the ram. The bearing 65 transfers the thrust from the cutting tool through the ram up into the sledge and constrains the ram to rotate about the required axis. The bearing 65 thereby imparts both axial and rotational stiffness to the ram.

The lower end of the ram is arranged to engage a tool unit from a tool unit store such as a carousel unit in a conventional manner. The downwardly facing surface of the ram includes sockets into which studs from a tool unit can enter and locations devices to accurately align and secure the tool unit to the ram.

As shown in FIG. 3, electrical services 64 and hydraulic fluid services 66 are connected to the ram to enable operations of the ram, and in particular the pick up and release of tool units from the bottom of the ram to be performed. The shaft 40 is arranged to engage with a socket in a tool unit in order to be able to cause a tool mounted on an output shaft of a tool unit to rotate. The tool of the tool unit may rotate about an axis coincident with or parallel to the axis of the ram 42 or may rotate about an axis extending at any angle to the axis of rotation of the ram 42.

It will be appreciated that the precise angular position of the ram 42 relative to the housing will be important in certain circumstances such as when the tool of the tool unit is rotating and being advanced in a direction in the horizontal plane. In order to ensure the precise angular position of the ram, a hirth ring 68 surrounds the ram 42 and is able to engage with downwardly extending teeth 70 secure with the ram 42 in order to bring the ram into the required angular position and maintain the ram in that position. The hirth ring 68 is connected to a support 72 by a flexible arm 74. A piston 76 is connected to the hirth ring and, upon pressurization of a chamber 78, can move downwardly in order to disengage the hirth ring 68 from the teeth of the ram (in which position the ram may rotate) or, upon pressurization of a chamber 80, can move upwardly to cause the hirth ring 68 to engage the teeth or the ram (to prevent the ram from rotating and to bring the ram into the precise angular orientation required).

It can be seen from FIG. 2 that the diameter of the bottom of the ram is relatively very small as that portion of the ram extending beneath the housing is caused to rotate and reciprocate by parts located away from the bottom region. Thus the machine tool can be used to bore out a relatively small hole in a workpiece. That machining may comprise mounting the tool unit on the end of the ram having an output shaft extending in the horizontal or any other required direction. Rotation of the shaft 40 then causes rotation of the cutting tool about its axis. At the same time as the cutting tool is rotating about its axis and cutting into the walls of the workpiece the ram can be rotated about its axis to cause the output shaft of the tool unit to rotate in a horizontal plane. If required, the housing can also be moved in the x and y directions, separately or together. Furthermore, the ram can move downwardly into the feature being cut to enable the machine tool to cut workpieces which are relatively deep in the z direction.

The ram can be clamped in the housing by hydraulically operating clamps 82 located at either end of the passage way in the housing, as shown in FIG. 3 to provide maximum stiffness to the ram for instance during certain high performance machining operations. When the ram is clamped it may still rotate but the clamp ensures that the axis of rotation is not deflected.

The ram is that part of the device which carries the tool (either directly or indirectly) towards and away from a workpiece and which also absorbs or reacts against the forces tending to deflect a tool from the intended path of milling or cutting.

The ram on a milling machine is a cantilevered structure which supports the spindle and provides accurate location and support to a variety of attachable auxiliary spindle heads on its forward face which are designed to satisfy a variety of particular machining operations.

The ram is required to traverse the machine spindle such that its axis follows a precise straight line perpendicular to the X Y Plane of the machine tool with a feed mechanism of such stiffness as to provide for all of the machining operations required, either from the machine spindle directly, or from the variety of attachable auxiliary spindle heads which are supported by it.

The ram is also required to provide such axial, transverse and torsional stiffness for all of the machining operations required, either from the machine spindle, or from the variety of attachable auxiliary spindle heads which are supported by it when fed in any required combination of Traverses X Y Z.

We claim:

1. A machine tool arrangement including a housing (12), a ram (42) and a drive shaft (40), the drive shaft extending through the ram and being rotatable relative to the ram, the ram and the housing including cooperating portions which enable the ram to move translationally and pivotally relative to the housing, the ram further including tool unit engaging means which enable the ram to be connected to a tool unit whereby, when the ram is connected to a tool unit, pivotal movement of the ram relative to the housing is arranged to alter the orientation of the rotational axis of a tool in the tool unit relative to the rotational axis of the drive shaft, and rotational movement of the drive shaft is arranged to cause a tool of the tool unit to rotate about the axis of the tool.

2. An arrangement as claimed in claim 1 in which at least a part of the ram (42) includes a cylindrical outer surface.

3. An arrangement as claimed in claim 2 in which at least a part of the housing (12) includes an inwardly facing cylindrical surface (54).

4. An arrangement as claimed in claim 3 in which the cylindrical outer surface of the ram (42) and the inwardly facing cylindrical surface of the housing (12) comprise the co-operating portions of the ram (42) and the housing (12) which enable the ram (42) to move translationally and pivotally relative to the housing (12).

5. An arrangement as claimed in claim 1 in which the housing includes clamping means (82) which are selectively operable.

6. An arrangement as claimed in claim 5 in which the clamping means (82) are arranged to co-operate with the ram at two spaced locations.

7. An arrangement as claimed in claim 1 in which the ram (42) is connected to an intermediate portion (16) which intermediate portion is slidably mounted on the housing (12).

8. An arrangement as claimed in claim 7 in which the connection of the ram (42) with the intermediate portion (16) is located on the opposite side of the co-operating portions of the ram and housing to that on which the output of the drive shaft (40) is located.

9. An arrangement as claimed in claim 7 in which the intermediate portion (16) includes drive means (60, 62) arranged to cause the ram (42) to rotate relative to the housing (12).

10. An arrangement as claimed in claim 7 in which the intermediate portion (16) and the ram (42) include locking means (68, 70) which are operable to prevent rotation of the ram (42) relative to the intermediate portion.

11. An arrangement as claimed in claim 1 in which the drive shaft (40) extends beyond at least one end of the ram (42).

12. An arrangement as claimed in claim 7 in which the drive shaft (40) is arranged to be driven by further drive means (44, 46) arranged to move with the intermediate portion (16).

13. An arrangement as claimed in claim 1 in which the housing (12) is movable along at least one axis extending transversely to the direction in which the ram (42) is movable translationally relative to the housing.

14. A machine tool arrangement including a housing (12), a ram (42) and a drive shaft (40), the drive shaft extending through the ram and being rotatable relative to the ram (42), the ram being movable translationally relative to the housing, the ram and the housing including cooperating portions characterized in that the ram is pivotable relative to the housing and is connected to a tool unit which tool unit rotatably supports a tool whereby pivotal movement of the ram relative to the housing is arranged to alter the orientation of the rotational axis of the tool relative to the rotational axis of the drive shaft, and rotational movement of the drive shaft is arranged to rotate the tool about the axis of the tool, with said cooperating portions of the ram and housing being arranged to cooperate with each other during relative pivotal and relative translational movement.

15. A method of operating a machine tool arrangement including a housing (12), a ram (42) and a drive shaft (40) comprising rotating the drive shaft relative to the ram to cause a tool of a tool unit to rotate about the axis of the tool and moving the ram translationally relative to the housing, characterized in that pivotal movement of the ram relative to the housing causes the orientation of the axis of rotation of the tool to be altered relative to the rotational axis of the drive shaft (40) with the ram and the housing including cooperating portions, said cooperating portions cooperating with each other during both relative translational and relative pivotal movement.

16. A method as claimed in claim 15 comprising moving the ram (42) simultaneously both translationally and pivotally relative to the housing.

17. A method as claimed in claim 15 comprising causing a surface of the ram (42) to slide and pivot against a surface (54) of the housing.

18. A method as claimed in claim 15 comprising causing rotation of a tool with the drive shaft (40) and simultaneously causing translational or pivotal movement of the ram while the workpiece is being machined with a tool.

* * * * *